(12) United States Patent
Best et al.

(10) Patent No.: US 8,975,593 B1
(45) Date of Patent: Mar. 10, 2015

(54) GAS AVALANCHE NEUTRON DETECTOR

(75) Inventors: David J. Best, Huntsville, AL (US);
Daniel T. Wakeford, Pembroke (CA);
Hugh Robert Andrews, Pembroke (CA); Harry Ing, Deep River (CA);
Marius Facina, Deep River (CA);
Michael Dick, Pembroke (CA)

(73) Assignees: SCI Technology, Inc., Huntsville, AL (US); Bubble Technologies Industries Inc., Chalk River, Ontario (CA)

( * ) Notice: Subject to any disclaimer, the term of this patent is extended or adjusted under 35 U.S.C. 154(b) by 0 days.

(21) Appl. No.: 13/612,356

(22) Filed: Sep. 12, 2012

Related U.S. Application Data

(60) Provisional application No. 61/533,784, filed on Sep. 12, 2011.

(51) Int. Cl.
*G01T 3/00* (2006.01)

(52) U.S. Cl.
USPC .......................................................... 250/391

(58) Field of Classification Search
CPC ................................. G01T 3/00; G01T 1/2935
USPC ................. 250/391, 390.01–390.12
See application file for complete search history.

(56) References Cited

U.S. PATENT DOCUMENTS

| | | | | |
|---|---|---|---|---|
| 2,994,773 | A | * | 8/1961 | Sternglass ..................... 250/389 |
| 4,309,307 | A | * | 1/1982 | Christophorou et al. ..... 252/372 |
| 4,447,727 | A | * | 5/1984 | Friesenhahn ............ 250/390.01 |
| 5,025,162 | A | * | 6/1991 | Charpak .................... 250/385.2 |
| 5,430,777 | A | * | 7/1995 | Burel ............................. 376/154 |
| 2006/0163487 | A1 | * | 7/2006 | Ambrosi et al. ......... 250/390.01 |
| 2010/0258736 | A1 | * | 10/2010 | McCormick et al. .... 250/390.01 |
| 2011/0068275 | A1 | * | 3/2011 | McCormick .................. 250/391 |
| 2011/0220802 | A1 | * | 9/2011 | Frisch et al. ............. 250/363.03 |

OTHER PUBLICATIONS

D.W. MacArthur, "A neutron detector based on micochannel plates," 1987, Los Alamamos National Laboratory.*

* cited by examiner

*Primary Examiner* — Kiho Kim
(74) *Attorney, Agent, or Firm* — Loza & Loza, LLP; Julio M. Loza

(57) ABSTRACT

A gas avalanche neutron detector (GAND) filled with counting gas for detecting thermal neutrons or neutron radiation without the use of a conventional proportional counter is provided. The GAND may include a layer of thermalization material, a cathode having a face with a layer of material, exhibiting neutron capture followed by charged particle emission such as Boron-10, a microstructure amplifier, and an anode. Thermal neutrons may enter the detector and interact with the material on the face of the cathode producing alpha particles. The alpha particles may ionize the counting gas inside the detector and produce ionization electrons. The cathode, microstructure amplifier and anode may have voltages applied that create electric fields that cause the ionization electrons to drift toward the microstructure amplifier. The microstructure then accelerates the electrons causing an avalanche effect within the gas and provides an amplification of the signal dramatically increasing neutron detection sensitivity.

20 Claims, 12 Drawing Sheets

Optimization of Electronic Field for Gain and Raw Counts

GAS AVALANCHE NEUTRON DETECTOR

CLAIM OF PRIORITY UNDER 35 U.S.C. §119

The present Application for Patent claims priority to U.S. Provisional Application No. 61/533,784 entitled "Gas Avalanche Neutron Detector (GAND)", filed Sep. 12, 2011, assigned to the assignee hereof and hereby expressly incorporated by reference herein.

STATEMENT REGARDING FEDERALLY SPONSORED RESEARCH OR DEVELOPMENT OR SPONSORSHIP

This invention was made with Government support under Contract No. HSHQDC-10-C-00009 from the U.S. Department of Homeland Security. The Government has certain rights in this invention.

FIELD

Various features relate to improvements to neutron detectors.

BACKGROUND

After the terrorist attacks of Sep. 11, 2001, there has been an increasing focus in the United States, as well as the rest of the world, to protect against future terrorist attacks. Unlike several years ago, protection from terrorist attacks is not just limited to conventional weapons such as small arms, light weapons and cluster munitions. Now terrorists are becoming quite sophisticated and radiological and/or nuclear attacks have become serious threats.

To successfully fight against radiological and nuclear terrorism, it is critical that radiological or nuclear materials that are either in transit or in a device which has been planted are detected. As background radiation in the environment is common and there are many innocent materials that are radioactive this process can be difficult. Further complicating this process is the need for the flow of commerce to be unimpeded and not unnecessarily alarm the public.

One type of conventional detector for detecting radiological or nuclear materials utilizes large cylindrical gas proportional counters that are filled with Helium-3 (He-3) gas, surrounded by thermalization material, to detect fission neutrons. The thermalization material acts to convert incident fast neutrons to thermal neutrons which are efficiently detected by He-3. Descriptions of He-3 gas proportional counters (and other similar gas counters) are given in standard reference books (e.g. G. F. Knoll, Radiation Detection and Measurement, third edition (John Wiley & Sons, New Jersey, 1999) Chapter 14.)

He-3 is a non-radioactive isotope of helium that is extremely sensitive at detecting neutron radiation. When thermal neutrons interact with the gas, charged particles are formed, which can be easily ascertained by the sensors. However, due to the recent world shortage of He-3 gas, there is a need to replace He-3 gas by another method of detecting thermal neutrons efficiently.

One approach is to deploy a thin layer of Boron-10 (B-10), which has a strong affinity for thermal neutrons and converts the thermal neutrons into charged particles that result from the nuclear interaction. The charged particles are then detected by the gas filling a conventional proportional counter. U.S. Pat. No. 7,952,078 B2 (May 31, 2011) describes an optimization of the B-10 coating to achieve increased detection efficiency.

In view of the He-3 shortage, an entirely different mechanism that provides detection sensitivity and efficiency comparable to a conventional He-3 proportional countered is needed. A gas avalanche neutron detector (GAND) that employs a thin B-10 layer as a neutron converter is one approach to provide an extremely sensitive detector neutron radiation without the use of He-3 gas.

SUMMARY

The following presents a simplified summary of one or more implementations in order to provide a basic understanding of some implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

According to one feature, a neutron detector is provided. The neutron detector may include an anode; a cathode having a face including a material exhibiting neutron capture followed by charged particle emission; and a microstructure amplifier positioned between the anode and cathode. The material is selected from at least one of boron-10, a boron containing compound, and lithium-6 and the microstructure amplifier may be a gas electron multiplier. The anode, cathode and microstructure amplifier are immersed in a counting gas, such as P-10, and configured as substantially parallel plates. Additionally, the anode, microstructure amplifier, and cathode can form a detection unit, and a plurality of detection units can be stacked in depth within a single detector enclosure.

An amplified electron signal can be sensed at the anode and read out via an electronic component. In one embodiment, a signal in the form of electrical transients on the microstructure amplifier may be detected upon elimination of the anode.

Additionally, the microstructure amplifier can also include at least one surface having the material exhibiting neutron captured followed by charged particle emission. The surface may be located on the side facing the cathode.

According to another feature, a method of detecting neutrons using a gas avalanche neutron detector (GAND) is provided. The method includes positioning the neutron detector in a location for allowing the neutron detector to interact with a field of neutrons; introducing the neutrons to a layer of thermalization material to yield thermal neutrons; interacting the thermal neutrons with a cathode in the neutron detector, the cathode having a face including a material exhibiting neutron capture followed by charged particle emission; introducing the charged particles to a counting gas, such as P-10, in the neutron detector to ionize the counting gas to produce ionization electrons; and interacting the ionization electrons with a microstructure amplifier, such as a gas electron multiplier, creating an avalanche of electrons. The material can be selected from at least one of boron-10, a boron-containing compound, and lithium-6.

The method may also include sensing an amplified signal on an anode in the neutron detector; and reading the amplified signal using an electronic component. The layer of thermalization material may be a polyethylene moderator or the layer of thermalization material can form a substrate of the cathode, the microstructure amplifier and the anode.

According to another feature, a neutron detector is provided. The neutron detector includes means for positioning the neutron detector in a location for allowing the neutron detector to interact with a field of neutrons; means for introducing the neutrons to a layer of thermalization material to yield thermal neutrons; means for interacting the thermal neutrons with a cathode in the neutron detector, the cathode having a face including a material exhibiting neutron capture followed by charged particle emission; means for introducing the charged particles to a counting gas in the neutron detector to ionize the counting gas to produce ionization electrons; and means for interacting the ionization electrons with a microstructure amplifier creating an avalanche of electrons.

BRIEF DESCRIPTION OF THE DRAWINGS

Various features, nature, and advantages may become apparent from the detailed description set forth below when taken in conjunction with the drawings in which like reference characters identify correspondingly throughout.

DETAILED DESCRIPTION OF THE INVENTION

Figure 1:
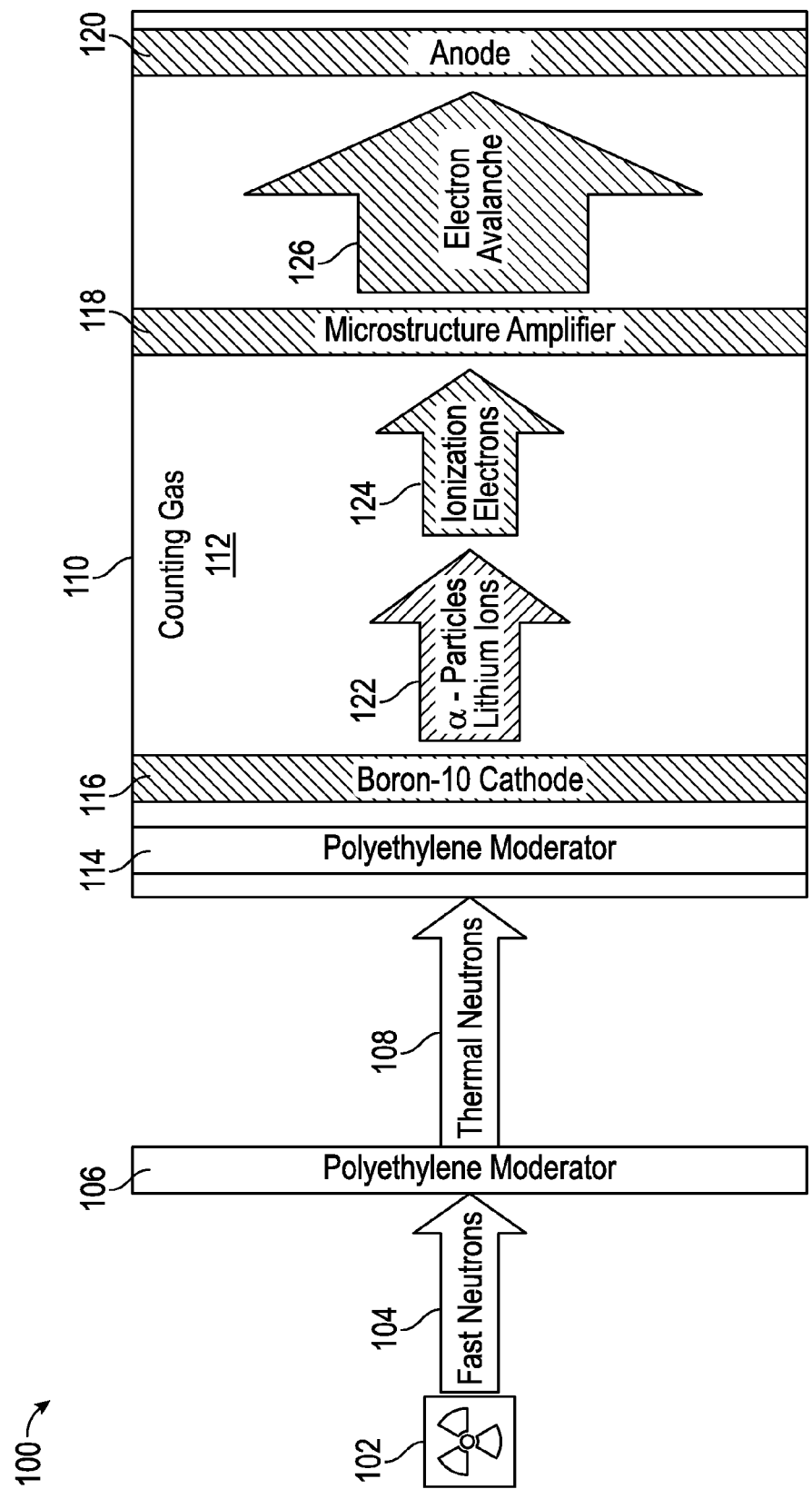
FIG. 1 illustrates how neutrons are generated by an external radioactive source and a neutron detection device having a material (B-10), exhibiting neutron capture followed by charged particle emission, on a face of a cathode, according to one example.

In the following detailed description, numerous specific details are set forth in order to provide a thorough understanding of the embodiments. However, it will be understood by one of ordinary skill in the art that the embodiments may be practiced without these specific details. For example, well-known operations, structures and techniques may not be shown in detail in order not to obscure the embodiments.

The word "exemplary" is used herein to mean "serving as an example, instance, or illustration." Any implementation or embodiment described herein as "exemplary" is not necessarily to be construed as preferred or advantageous over other embodiments. Likewise, the term "embodiments" does not require that all embodiments include the discussed feature, advantage or mode of operation.

Overview

According to one feature, a gas avalanche neutron detector (GAND) filled with counting gas for detecting thermal neutrons or neutron radiation without the use of a conventional proportional counter is provided. The neutron detector may use a microstructure amplifier within the counting gas of the detector in place of the conventional proportional counter. The microstructure amplifier, such as a Gas Electron Multiplier (GEM), may be used for electron amplification. The GEM causes an electric field to bridge from one side to the other accelerating electrons through a gas. Other microstructure amplifier designs may include the Thick Gas Electron Multiplier (THGEM) and the Resistive Electrode Thick Gas Electron Multiplier (RETGEM) as well as others. The microstructure amplifier may include a thin insulator covered with a conductive material (e.g. copper), and made porous by thousands of tiny (~50 µm) holes. Applying a voltage across the coated insulator may result in electron amplification. The amplified electron signal may then be sensed on the anode and read out via electronic components.

Gas Electron Multiplier detectors with one or more thin layers of material that exhibit neutron capture followed by charged particle emission, such as boron-10, are provided. According to one embodiment, the thickness of the material may be selected to be sufficiently thick to promote neutron capture, while sufficiently thin to enable the resulting charged particle to escape from the material. In one example, the thickness of the material may be in the range of 0.0005 mm to 0.003 mm.

These detectors can detect thermal neutrons for scientific research applications in support of pulsed spallation-neutron sources for "cold" neutron scattering. The detectors can include high spatial resolution and high detection efficiency for thermal and cold neutrons. The neutron detector may be driven by high detection efficiency for fast neutrons, ease of manufacturing and low cost, and without emphasis for high spatial resolution. Due to the detection requirement for fast neutrons, the neutron detector can incorporate thermalization material with a microstructure amplifier, as the basic detector unit. These various requirements drive the design of the neutron detector, which employs microstructure amplifiers that can be manufactured economically using industrial circuit card manufacturing techniques or microfabrication techniques.

The interaction of thermal neutrons with the boron-10 isotope is well known. Similar to other detectors and in the neutron detector, a thermalization material is incorporated external to the detector. In one example, the boron-10 isotope may be located on a cathode. This interaction produces alpha particles which then interact with a proportional counting gas to strip electrons from gas atoms. In other detectors, these electrons are detected to produce a signal that a neutron has been detected. In the neutron detector described herein, the stripped electrons are accelerated by an electric field from a microstructure amplifier assembly which then causes an avalanche effect within the gas and provides an amplification of the signal thus dramatically increasing neutron detection sensitivity. In the neutron detector, the layers of boron-10 can be applied to the cathode but may also be applied to other surfaces including those of the microstructure amplifier assembly to in effect create an additional cathode. In the neutron detector, thermalization material may be reduced or added via incorporation into the internal or external neutron detector to adjust neutron detection response.

In other words, a gas avalanche neutron detector (GAND) filled with counting gas for detecting thermal neutrons or neutron radiation is provided. The GAND may include a layer of thermalization material, a cathode having a face with a layer of material, exhibiting neutron capture followed by charged particle emission such as Boron-10, a microstructure amplifier, and an anode. Thermal neutrons may enter the detector and interact with the material on the face of the cathode producing alpha particles. The alpha particles may ionize the counting gas inside the detector and produce ionization electrons. The cathode, microstructure amplifier and anode may have voltages applied that create electric fields that cause the ionization electrons to drift toward the microstructure amplifier. The microstructure then accelerates the electrons causing an avalanche effect within the gas and provides an amplification of the signal dramatically increasing neutron detection sensitivity.

According to one example, the neutron detector described herein may be used in airport scanning machines to detect radioactive material in luggage.

According to another example, the neutron detector described herein may be used to detect radioactive material in freight trucks, cargo containers, etc. A pair of towers, separated by the width of a vehicle or vessel, may include neutron detectors. The neutron detectors may detect radioactive material located in vehicles and vessels, as well as its cargo, as the vehicles and vessels pass between the pair of towers.

Neutron Detector, Having Layer of Boron on Cathode, and Operations Therein

FIG. 1 illustrates how neutrons are generated by an external radioactive source and a neutron detection device (or neutron detector) 100 having a material, exhibiting neutron capture followed by charged particle emission, on a face of a cathode, according to one example. The material can include, but is not limited to, boron-10, a boron containing compound, and lithium-6. According to one embodiment the face of the cathode may have a smooth or wavy surface.

As shown, radioactive materials 102 emit fast neutrons 104 which are slowed or moderated by a layer of a high hydrogen content thermalization material 106 to yield thermal neutrons 108. In some implementations, this material may be high density polyethylene plastic. Thermal neutrons 108, as well as un-moderated fast neutrons 104, can penetrate the detector 100.

The detector 100 may include a metal enclosure 110 that houses gas avalanche neutron detector (GAND) functional elements filled with a counting gas 112, for example P-10 counting gas. According to one example, the detector 100 may include a layer of thermalization material 114, such as a polyethylene moderator, a cathode 116 having a face with a layer of material, exhibiting neutron capture followed by charged particle emission such as Boron-10, a microstructure amplifier 118, such as a Gas Electron Multiplier (GEM), and an anode 120.

Any un-moderated fast neutrons that penetrate the metal enclosure can also interact with additional layers of the thermalization material in the metal enclosure to yield additional thermal neutrons. In some implementations, these additional layers of thermalization material 114 may be the substrates within the GAND functional elements.

As neutrons do not ionize, an intermediate reaction by which the neutrons release ionizing particles may be used in order to detect the neutrons. Such reactions are known to occur with boron, for example. In these reactions, the neutrons in interaction with atoms of the neutron reactive substance release alpha particles and these alpha particles can cause ionization of the gas within the detector.

According to one embodiment, the thermal neutrons 108 may enter the metal enclosure 110 and interact with the material on the face of the cathode 116. As discussed above, the material can include, but is not limited to, boron-10, a boron containing compound, and lithium-6. As described above, the interaction with the material, such as boron-10, may produce alpha particles and lithium ions 122 (the lithium ions are not relevant to the GAND functioning). The alpha particles 122 may ionize the counting gas 112 inside the GAND chamber and produce ionization electrons 124. That is, the alpha particles 122 may strip electrons from the counting gas 112. The cathode 116, microstructure amplifier 118, and anode 120 may have voltages applied that create electric fields that effect the movement of the ionization electrons 124. The ionization electrons 124 may drift toward the microstructure amplifier 118.

As described in more detail below, the microstructure amplifier 118 is a porous barrier. The electric field influence of the cathode 116 may cause the electrons to drift into the holes of the microstructure amplifier 118. As the ionization electrons 124 penetrate the microstructure amplifier 118, the applied voltage creates an electric field which causes an avalanche of electrons 126, which in essence multiplies or amplifies their numbers. The amplified electron signal may then be sensed on the anode 120 and read out via electronic components. In some implementations, the anode 120 may be eliminated and the amplified electron signal may be detected in the form of electrical transients on the microstructure amplifier 118.

Figure 2:
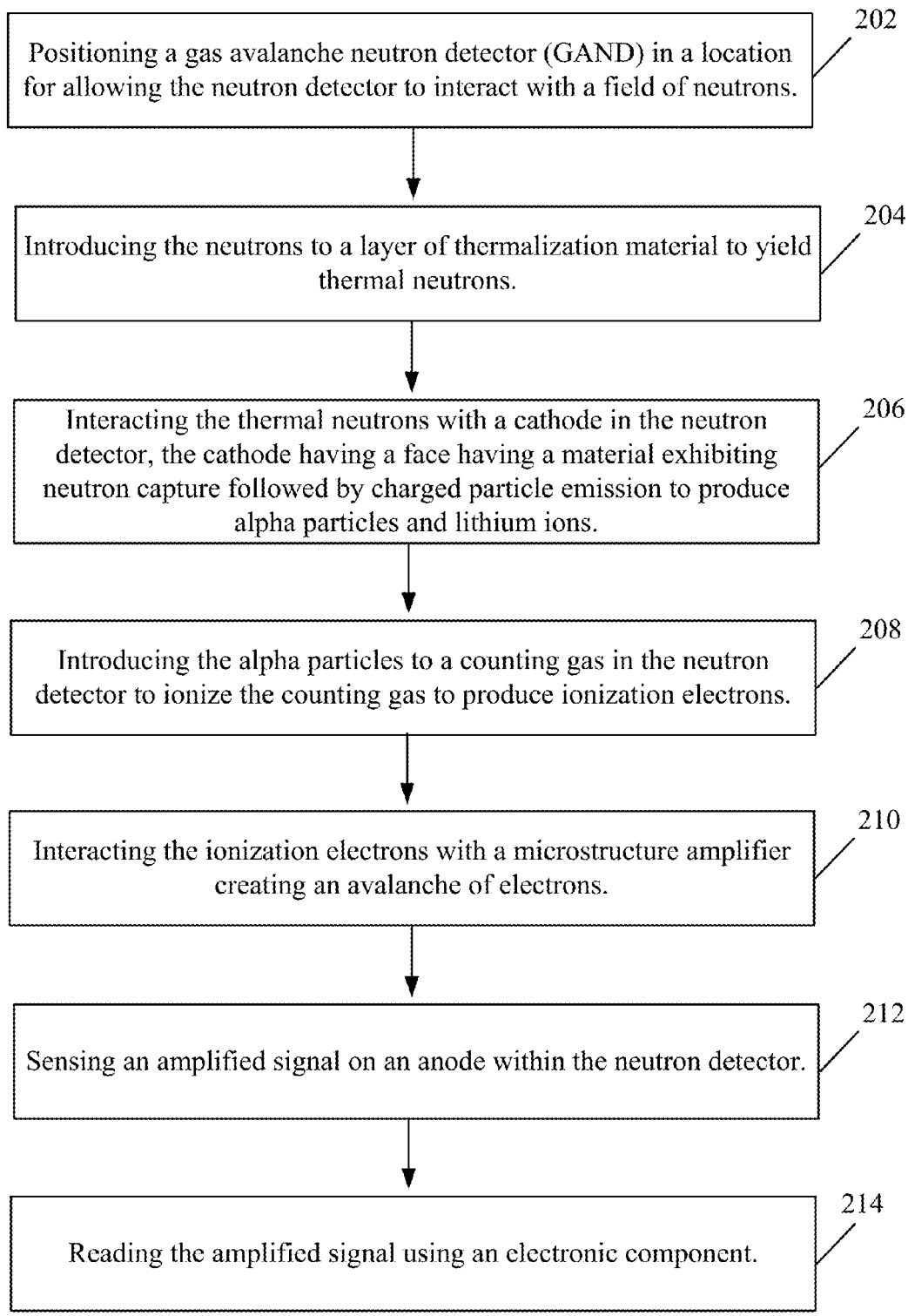
FIG. 2 illustrates a flow diagram of a method for detecting thermal neutrons or neutron radiation using a gas avalanche neutron detector (GAND) filled with counting gas, according to one example.

FIG. 2 illustrates a flow diagram of a method for detecting thermal neutrons or neutron radiation using a gas avalanche neutron detector (GAND) filled with counting gas, according to one example. As described above, the GAND elements may include a cathode having a face including a material, exhibiting neutron capture followed by charged particle emission, a microstructure amplifier, such as a Gas Electron Multiplier (GEM), and an anode.

First, a neutron detector, such as a gas avalanche neutron detector (GAND) may be positioned in a location to allow the neutron detector to interact with a field of neutrons 202. The neutrons may then be introduced to a layer of thermalization material 204, such as a polyethylene moderator to yield thermal neutrons. Un-moderated fast neutrons that penetrate the metal enclosure may interact with additional layers of the thermalization material located within the metal enclosure to yield additional thermal neutrons.

The thermal neutrons may then interact with a cathode having a face having a material (B-10), exhibiting neutron capture followed by charged particle emission, to produce alpha particles and lithium ions 206. According to one embodiment, the material can include, but is not limited to, boron-10, a boron containing compound, and lithium-6. Next, the alpha particles may be introduced to a counting gas in the neutron detector to ionize the counting gas inside the neutron detector chamber to produce ionization electrons 208. The cathode, microstructure amplifier, and anode in the neutron detector may have voltages applied that create electric fields that effect the movement of the ionization electrons.

The ionization electrons may be supplied to and interact with a microstructure amplifier creating an avalanche of electrons 210. Next, an amplified signal may be sensed on the anode within the neutron detector 212 and electronic components may be used to read the amplified signal 214.

Figure 3:
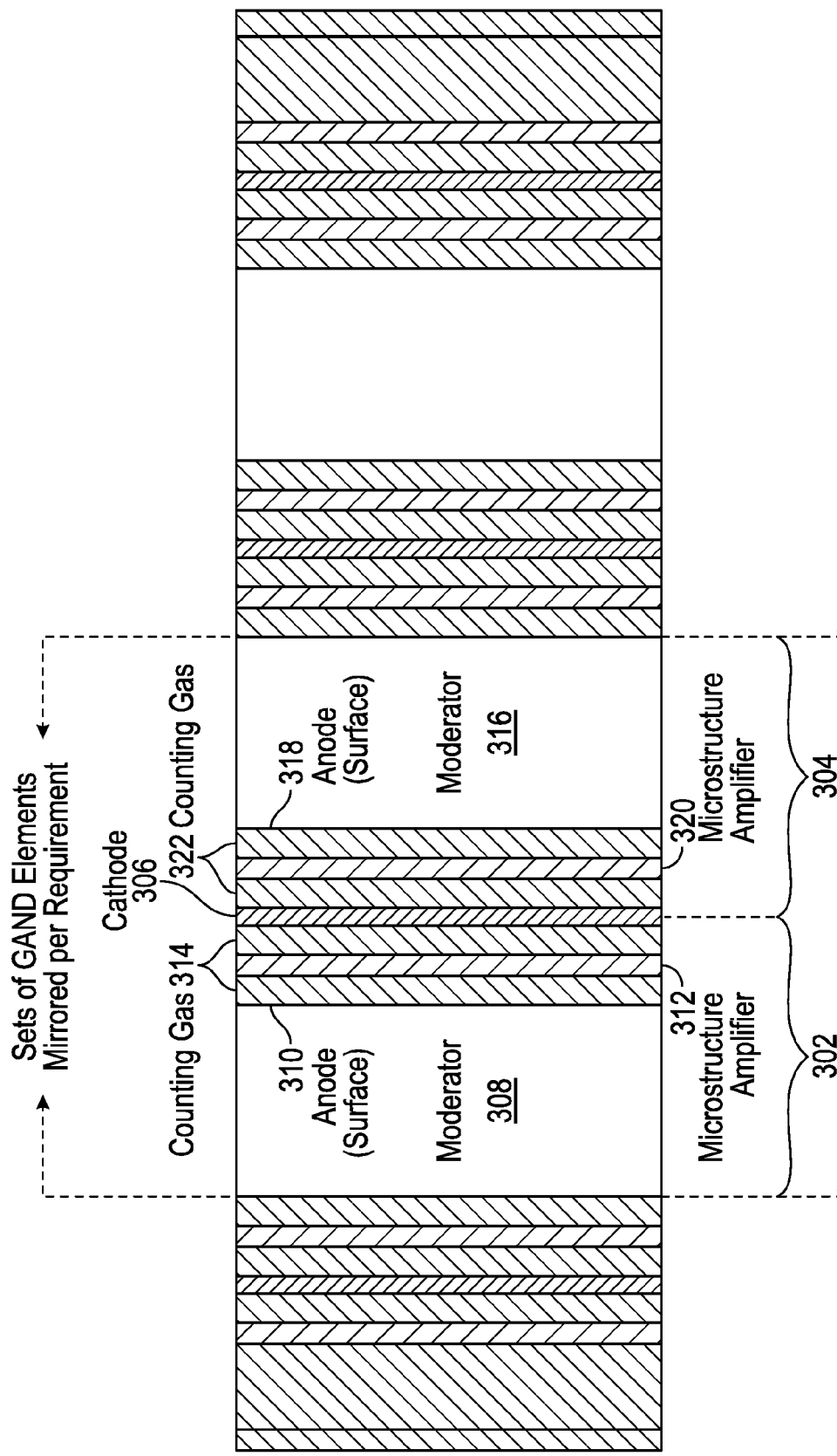
FIG. 3 illustrates in cross-section that multiple sets of thermalization material, cathode, microstructure amplifier, and anode combinations may be installed within the gas avalanche neutron detector (GAND) enclosure.

To enhance detection efficiency, FIG. 3 depicts in cross-section that multiple sets of thermalization material, cathode, microstructure amplifier, and anode combinations may be installed within a GAND enclosure. The number of sets in this stacking arrangement can vary depending on the detector geometry and detection efficiency requirements.

Referring to FIG. 3, a first set of GAND elements 302 and a second set of GAND elements 304 are shown, the second set of GAND elements 304 being a mirror image of the first set of GAND elements 302. According to one embodiment, the first set of GAND elements 302 and the second set of GAND elements 304 may share a cathode 306. The first set of GAND elements 302 may include a first layer of thermalization material 308, such as a polyethylene moderator (or first moderator), a first anode 310, a first microstructure amplifier 312 located between a first pair of gas filled volumes 314 and the cathode 306.

The second set of GAND elements may include a second layer of thermalization material 316, such as a polyethylene moderator (or first moderator), a second anode 318, a second microstructure amplifier 320 located between a second pair of gas filled volumes 322 and the cathode 306.

Figure 4:
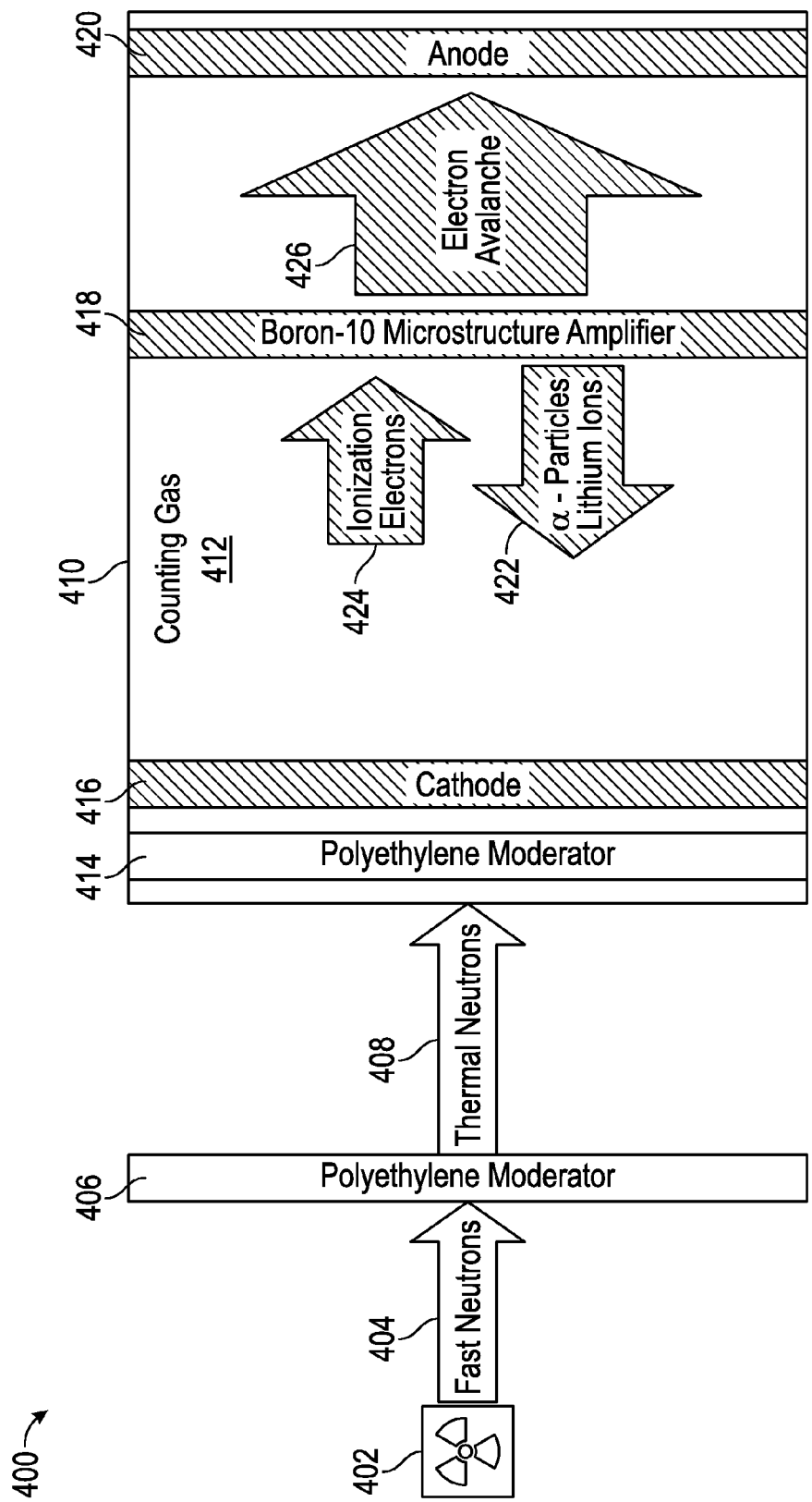
FIG. 4 illustrates how neutrons are generated by an external radioactive source and a neutron detection device having a material (B-10), exhibiting neutron capture followed by charged particle emission, on a microstructure amplifier, according to one example.

Neutron Detector, Having a Layer of Boron on Microstructure Amplifier, and Operations Therein FIG. 4 illustrates how neutrons are generated by an external radioactive source and a neutron detection device (or neutron detector) 400 having a material, exhibiting neutron capture followed by charged particle emission, on a microstructure amplifier, according to one example. The material can include, but is not limited to, boron-10, a boron containing compound, and lithium-6. According to one embodiment the face of the cathode may have a smooth or wavy surface.

As shown, radioactive materials 402 emit fast neutrons 404 which are slowed or moderated by a layer of a high hydrogen content thermalization material 406, for example, to yield thermal neutrons 408. In some implementations, this material may be high density polyethylene plastic. Thermal neutrons 408 as well as un-moderated fast neutrons 404 can penetrate the detector 400.

The detector 400 may include a metal enclosure 410 that houses gas avalanche neutron detector (GAND) functional elements filled with a counting gas 412, for example P-10 counting gas. According to one example, the detector 400 may include a layer of thermalization material 414, such as a polyethylene moderator, a cathode 416, a microstructure amplifier 418, such as a Gas Electron Multiplier (GEM), having a material (B-10), exhibiting neutron capture followed by charged particle emission, on the side facing the cathode and an anode 120.

Any un-moderated fast neutrons that penetrate the metal enclosure 410 can interact with additional layers of the thermalization material in the metal enclosure 410 to yield additional thermal neutrons. In some implementations, these additional layers of thermalization material 414 may be the substrates within the GAND functional elements.

As neutrons do not ionize, an intermediate reaction by which the neutrons release ionizing particles may be used in order to detect the neutrons. Such reactions are known to occur with boron, for example. In these reactions, the neutrons in interaction with atoms of the neutron reactive substance release alpha particles and these alpha particles can cause ionization of the gas within the detector.

According to one embodiment, the thermal neutrons 408 may enter the metal enclosure 410 and interact with the material, exhibiting neutron capture followed by charged particle emission, on the side of the microstructure amplifier facing the cathode 418. According to one embodiment, the material may be boron-10. As described above, the interaction with boron-10 may produce alpha particles and lithium ions 422 (the lithium ions are not relevant to the GAND functioning). The alpha particles 422 may ionize the counting gas 412 inside the GAND chamber and produce ionization electrons 424. That is, the alpha particles 422 may strip electrons from the counting gas 412. The cathode 416, microstructure amplifier 418, and anode 420 may have voltages applied that create electric fields that effect the movement of the ionization electrons 424. The ionization electrons 424 may drift toward the microstructure amplifier 418

As described in more detail below, the microstructure amplifier 418 is a porous barrier. The electric field influence of the cathode may cause the electrons to drift into the holes of the microstructure amplifier. As the ionization electrons 424 penetrate the microstructure amplifier 418, the applied voltage can create an electric field which causes an avalanche of electrons 426, which in essence multiplies or amplifies their numbers. The amplified electron signal may then be sensed on the anode 420 and read out via electronic components. In some implementations, the anode 420 may be eliminated and the amplified electron signal may be detected in the form of electrical transients on the microstructure amplifier 418.

Figure 5:
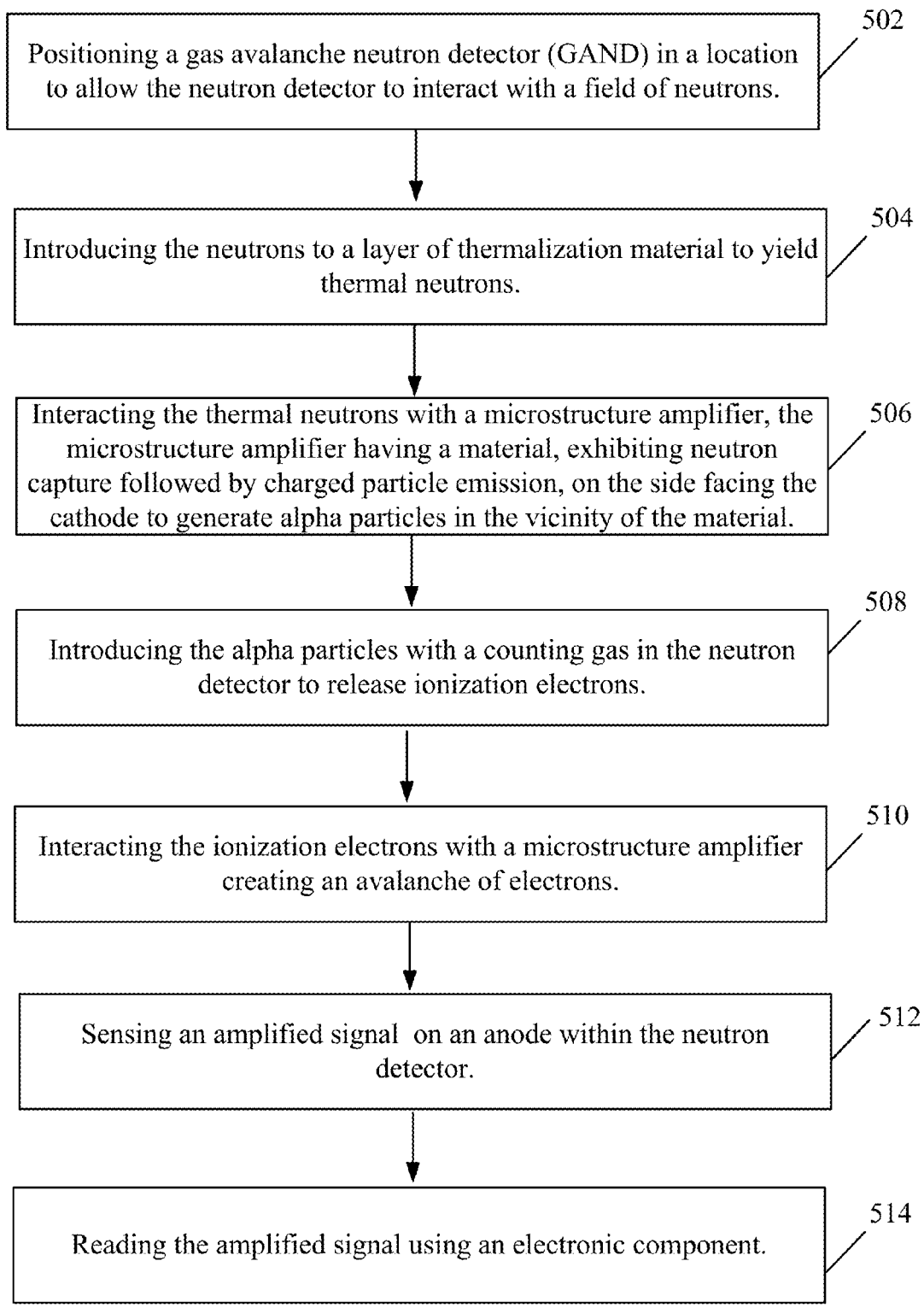
FIG. 5 illustrates a flow diagram of a method for detecting thermal neutrons or neutron radiation using a gas avalanche neutron detector (GAND) filled with counting gas, according to one example.

FIG. 5 illustrates a flow diagram of a method for detecting thermal neutrons or neutron radiation using gas avalanche neutron detector (GAND) filled with counting gas, according to one example. As described above, the GAND elements may include a cathode, a microstructure amplifier having a material (B-10), on the side facing the cathode, exhibiting neutron capture followed by charged particle emission, and an anode.

First, a neutron detector may be positioned in a location to allow the neutron detector to interact with a field of neutrons 502. The neutrons may then be introduced to a layer of thermalization material 504, such as a polyethylene moderator to yield thermal neutrons. Un-moderated fast neutrons that penetrate the metal enclosure may interact with additional layers of the thermalization material located within the metal enclosure to yield additional thermal neutrons.

The thermal neutrons may then interact with the material (B-10) on the microstructure amplifier and generate or produce alpha particles and lithium ions (the lithium ions are not relevant to the GAND functioning) in the vicinity of the material 506. The material can include, but is not limited to at least one of boron-10, a boron containing compound, and lithium-6.

Next, the alpha particles may be introduced to a counting gas in the neutron detector to ionize the counting gas inside the neutron detector chamber to produce ionization electrons 508. The cathode, microstructure amplifier, and anode in the neutron detector may have voltages applied that create electric fields that effect the movement of the ionization electrons. The ionization electrons may be supplied to and interact with a microstructure amplifier creating an avalanche of electrons 510. Next, the amplified signal may be sensed on the anode within the neutron detector 512 and electronic components may be used to read the amplified signal 514.

Figure 6:
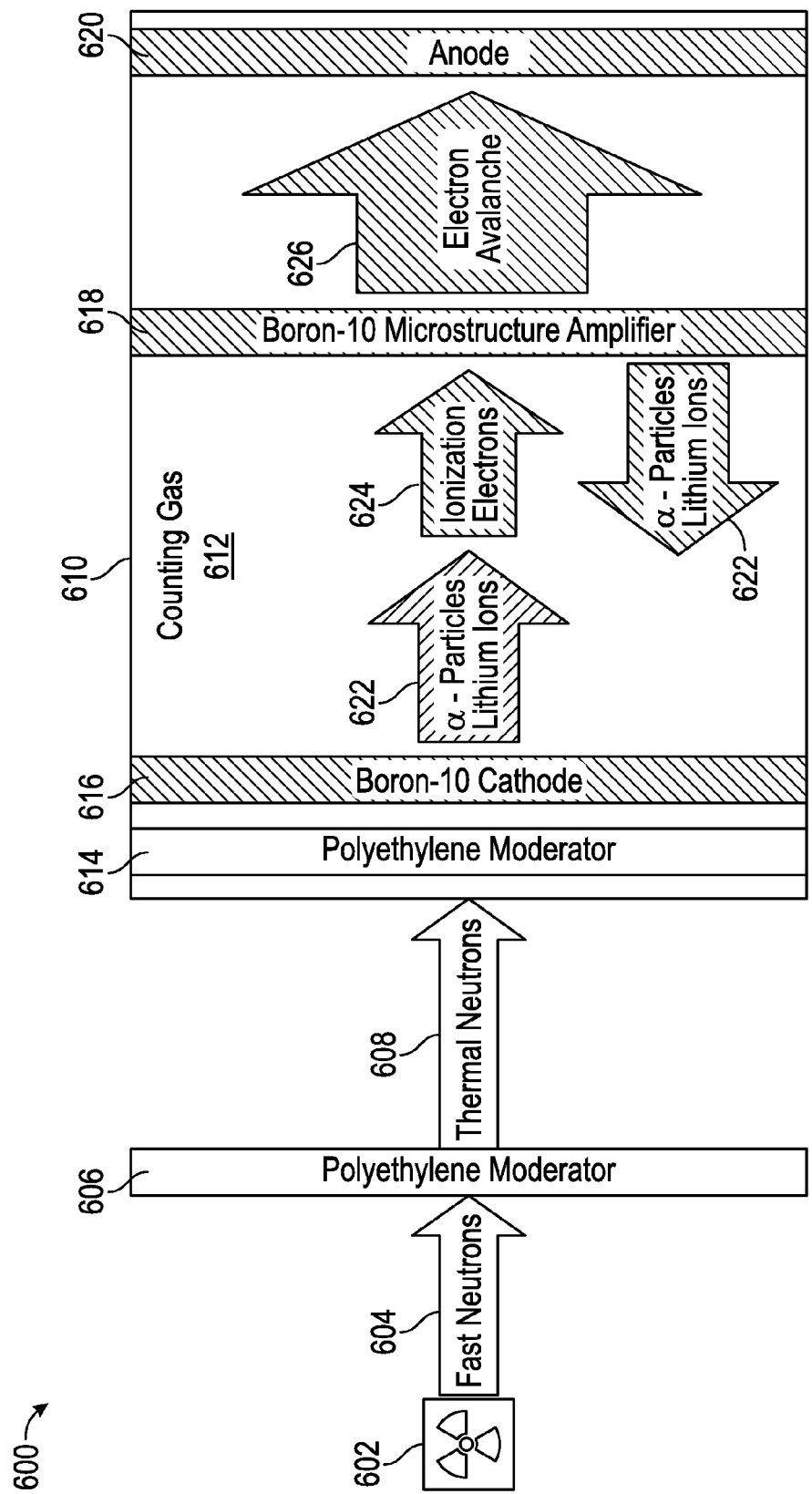
FIG. 6 illustrates how neutrons are generated by an external radioactive source and a neutron detection device having a material (B-10), exhibiting neutron capture followed by charged particle emission, on a face of a cathode and on the side of a microstructure amplifier facing the cathode, according to one example.

Neutron Detector, Having a Layer of Boron on Cathode and Microstructure Amplifier, and Operations Therein FIG. 6 illustrates how neutrons are generated by an external radioactive source and a neutron detection device (or neutron detector) 600 having a material, exhibiting neutron capture followed by charged particle emission, on a face of a cathode and on the side of a microstructure amplifier facing the cathode, according to one example. The material can include, but is not limited to, boron-10, a boron containing compound, and lithium-6. According to one embodiment the face of the cathode may have a smooth or wavy surface.

As shown, radioactive materials 602 emit fast neutrons 604 which are slowed or moderated by a layer of a high hydrogen content thermalization material 606, for example, to yield thermal neutrons 608. In some implementations, this material may be high density polyethylene plastic. Thermal neutrons 608 as well as un-moderated fast neutrons 604 can penetrate the detector 600.

The detector 600 may include a metal enclosure 610 that houses gas avalanche neutron detector (GAND) functional elements filled with a counting gas 612, for example P-10 counting gas. According to one example, the detector 600 may include a layer of thermalization material 614, such as a polyethylene moderator, a cathode 616 having a face with a layer of material, exhibiting neutron capture followed by charged particle emission, a microstructure amplifier 618, such as a Gas Electron Multiplier (GEM), having a material, exhibiting neutron capture followed by charged particle emission, and an anode 620.

Any un-moderated fast neutrons that penetrate the metal enclosure can also interact with additional layers of the thermalization material located within the metal enclosure 610 to yield additional thermal neutrons. In some implementations, these additional layers of thermalization material may be the substrates within the GAND functional elements.

As neutrons do not ionize, an intermediate reaction by which the neutrons release ionizing particles may be used in order to detect the neutrons. Such reactions are known to occur with boron, for example. In these reactions, the neutrons in interaction with atoms of the neutron reactive substance release alpha particles and these alpha particles cause ionization of the gas within the detector.

According to one embodiment, the thermal neutrons 608 may enter the metal enclosure 610 and interact with the material on the face of the cathode 616 and the material on the side of the microstructure amplifier facing the cathode 618. According to one embodiment, the material may be boron-10. As described above, the interaction with boron-10 may produce alpha particles and lithium ions 622 (the lithium ions are not relevant to the GAND functioning). The alpha particles 622 may ionize the counting gas 612 inside the GAND chamber and produce ionization electrons 624. That is, the alpha particles 622 may strip electrons from the counting gas 612. The cathode 616, microstructure amplifier 618, and anode 620 may have voltages applied that create electric fields that effect the movement of the ionization electrons 624. The ionization electrons 624 may drift toward the microstructure amplifier 618.

As described in more detail below, the microstructure amplifier 618 is a porous barrier. The electric field influence of the cathode may cause the electrons to drift into the holes of the microstructure amplifier. As the ionization electrons 624 penetrate the microstructure amplifier 618, the applied voltage can create an electric field which causes an avalanche of electrons 626, which in essence multiplies or amplifies their numbers. The amplified electron signal may then be sensed on the anode 620 and read out via electronic components. In some implementations, the anode 620 may be eliminated and the amplified electron signal may be detected in the form of electrical transients on the microstructure amplifier 618.

Figure 7:
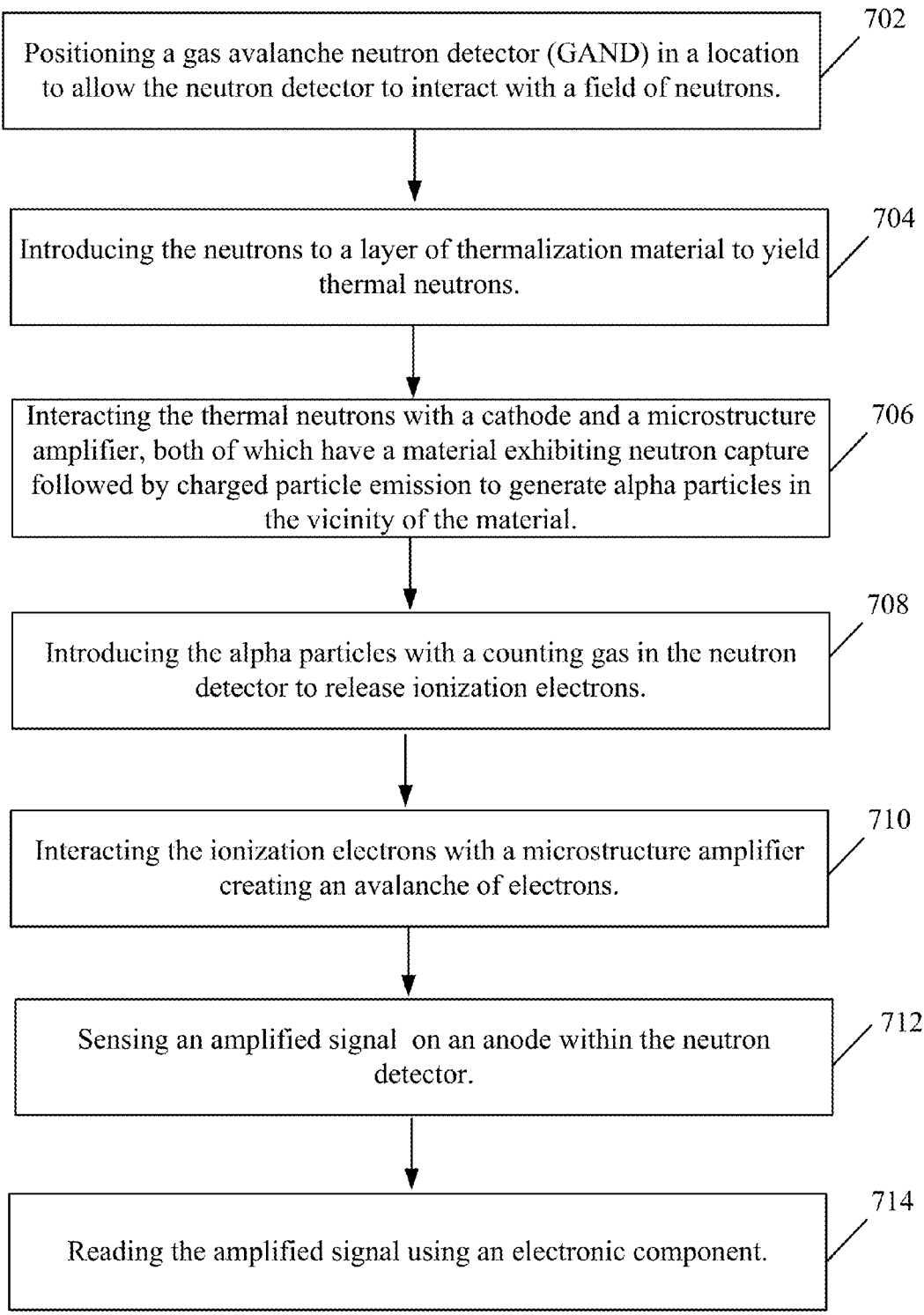
FIG. 7 illustrates a flow diagram of a method for detecting thermal neutrons or neutron radiation using a gas avalanche neutron detector (GAND) filled with counting gas, according to one example.

FIG. 7 illustrates a flow diagram of a method for detecting thermal neutrons or neutron radiation using gas avalanche neutron detector (GAND) filled with counting gas, according to one example. As described above, the GAND elements may include a cathode having a face including a material exhibiting neutron capture followed by charged particle emission, a microstructure amplifier having a material, on the side facing the cathode, exhibiting neutron capture followed by charged particle emission, and an anode.

First, a neutron detector may be positioned in a location to allow the neutron detector to interact with a field of neutrons 702. The neutrons may then be introduced to a layer of thermalization material 704, such as a polyethylene moderator to yield thermal neutrons. Un-moderated fast neutrons that penetrate the metal enclosure may interact with additional layers of the thermalization material located within the metal enclosure to yield additional thermal neutrons.

The thermal neutrons may then interact with the material (B-10) on cathode and on the side of the microstructure amplifier facing the cathode and generate or produce alpha particles and lithium ions (the lithium ions are not relevant to the GAND functioning) in the vicinity of the material 706. The material can include, but is not limited to at least one of boron-10, a boron containing compound, and lithium-6.

Next, the alpha particles may be introduced to a counting gas in the neutron detector to ionize the counting gas inside the neutron detector chamber to produce ionization electrons 708. The cathode, microstructure amplifier, and anode in the neutron detector may have voltages applied that create electric fields that effect the movement of the ionization electrons. The ionization electrons may be supplied to and interact with a microstructure amplifier creating an avalanche of electrons 710. Next, the amplified signal may be sensed on the anode within the GAND 712 and electronic components may be used to read the amplified signal 714.

Microstructure Amplifier

Figure 8:
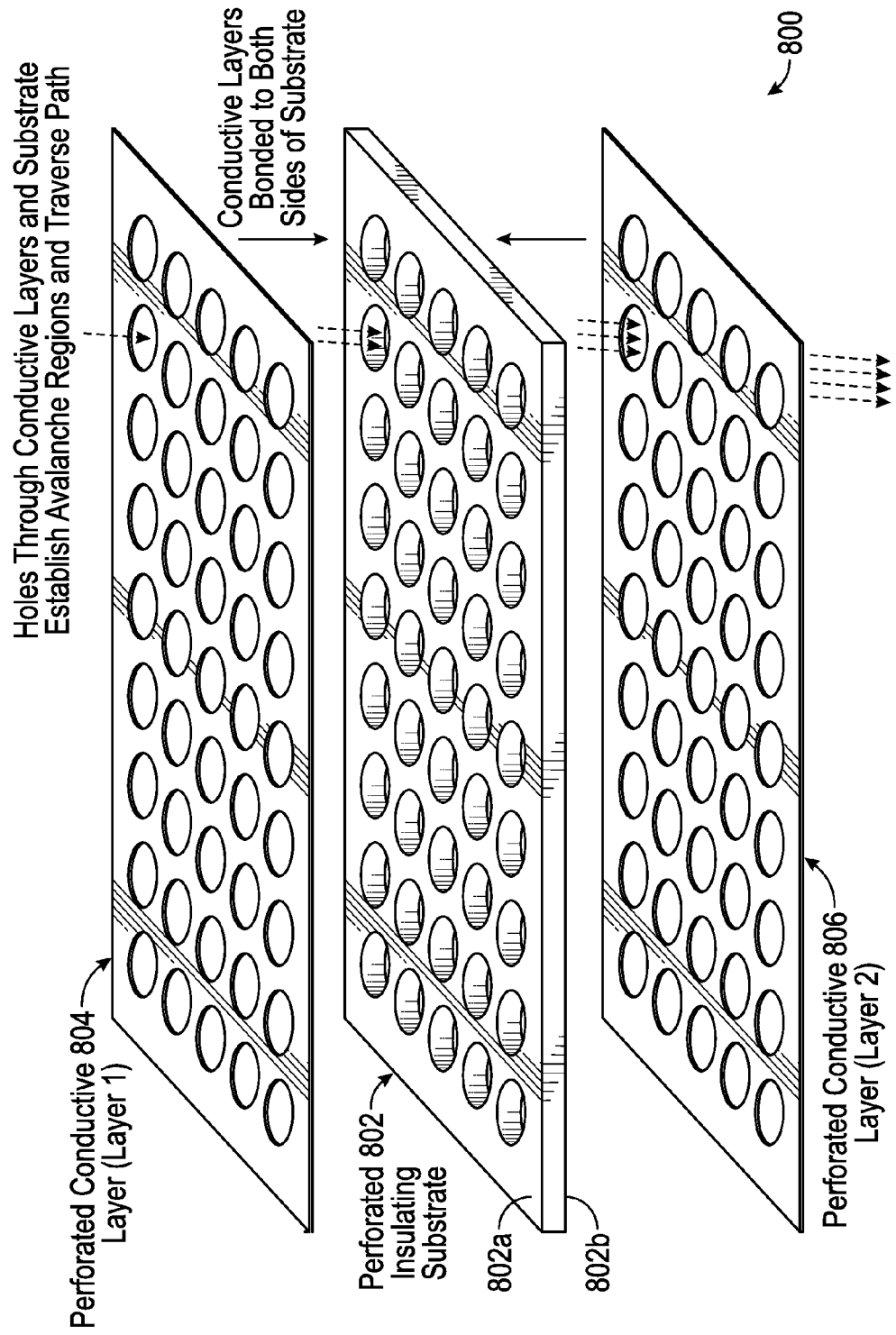
FIG. 8 illustrates an exploded view of a microstructure amplifier according to one example.

FIG. 8 illustrates an exploded view of a microstructure amplifier according to one example. As shown, the microstructure amplifier 800 may include a thin insulator 802, such as a perforated insulating substrate, having a first surface 802a and a second surface 802b. The first surface 802a of the thin insulator 802 may be covered with a first perforated conductive material/layer 804 (e.g. copper) and the second surface 802b of the thin insulator 802 may be covered by a second perforated conductive material/layer 806 (e.g. copper). The microstructure amplifier 800 may be made porous by thousands of tiny (~50 μm) holes extending through the first perforated conductive material/layer 804, the thin insulator 802, and the second perforated conductive material/layer 806. According to one embodiment, the holes located in each of the first perforated conductive material/layer 804, the thin insulator 802, and the second perforated conductive material/layer 806 of the microstructure amplifier 800 may be aligned establishing avalanche regions and traverse paths.

In the microstructure amplifier 800, an electric field can be generated by the first perforated conductive material/layer 804 and goes through the holes to the second perforated conductive material/layer 806. The electric field may cause an effect for the charged particles that are present when a neutron is detected. When a neutron is detected and charged particles are generated, the electric field on the microstructure amplifier 800 amplifies the effect.

Figure 9:
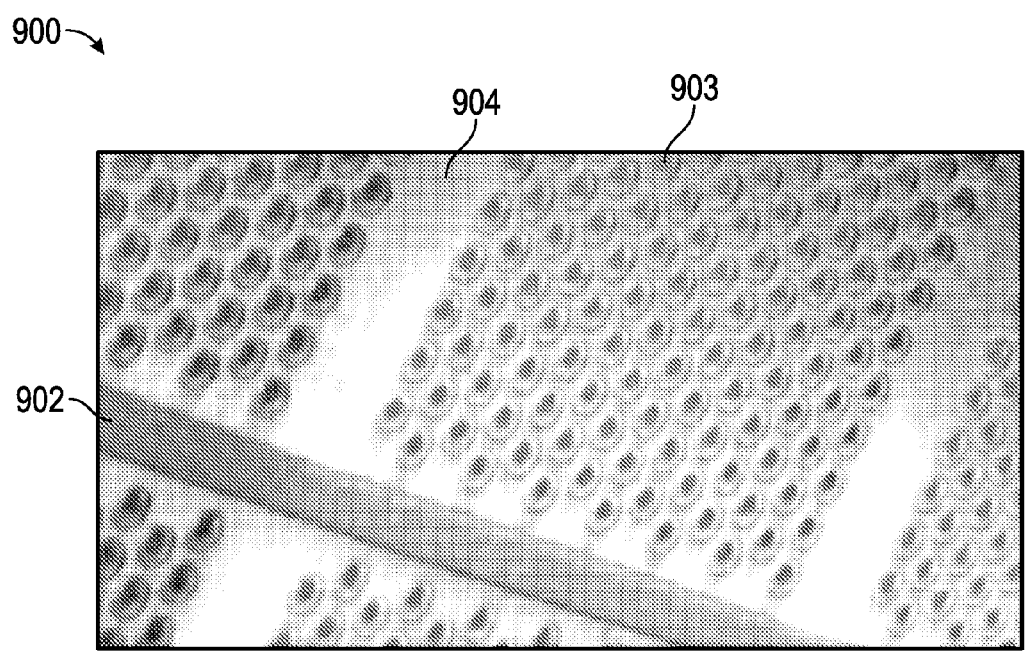
FIG. 9 illustrates a partial section of a microstructure amplifier according to one example.

FIG. 9 illustrates a partial section of a microstructure amplifier 900 according to one example. A plurality of through holes 903 extending through an insulating substrate 902, having a first surface and a second surface, with a first perforated conductive material/layer 904 (e.g. copper)

located on the first surface of the insulating substrate 902 and a second perforated conductive material/layer (not shown) located on the second surface of the insulating substrate 902 is shown.

Figure 10:
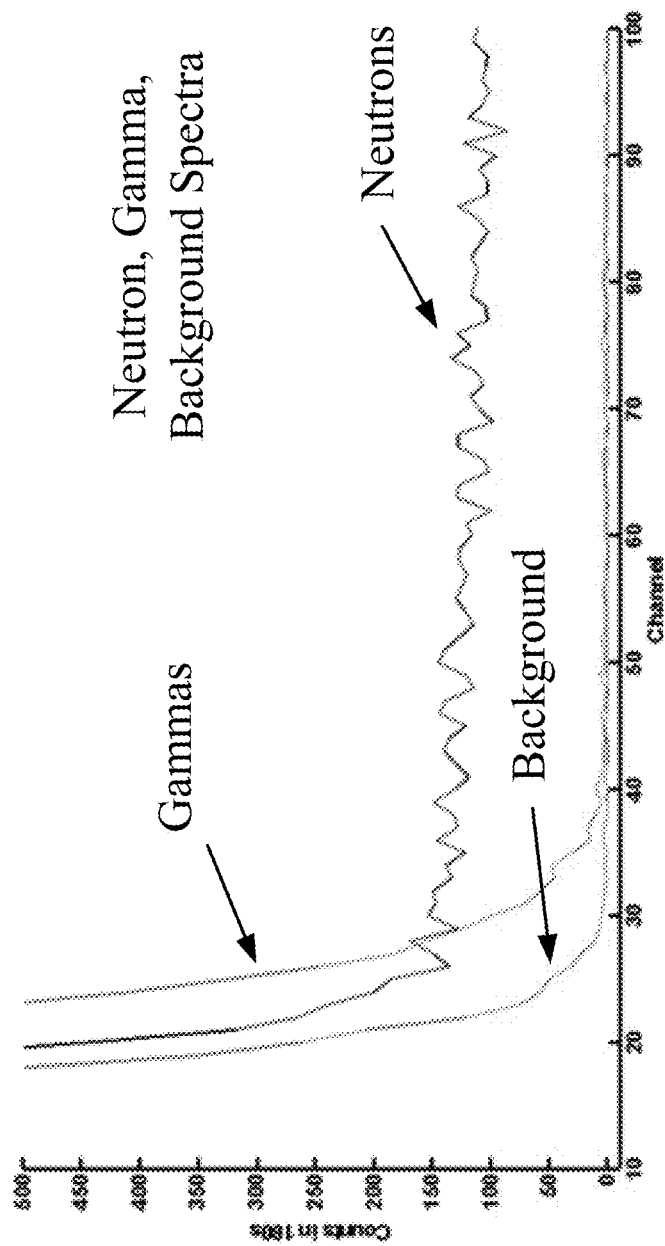
FIG. 10 is a graph showing the GAND response to background radiation (noise floor), gamma rays, and neutrons which predicts the ability of the GAND to detect neutrons.

FIG. 10 is a graph showing the GAND response to background radiation (noise floor), gamma rays, and neutrons which predicts the ability of the GAND to detect neutrons.

Figure 11:
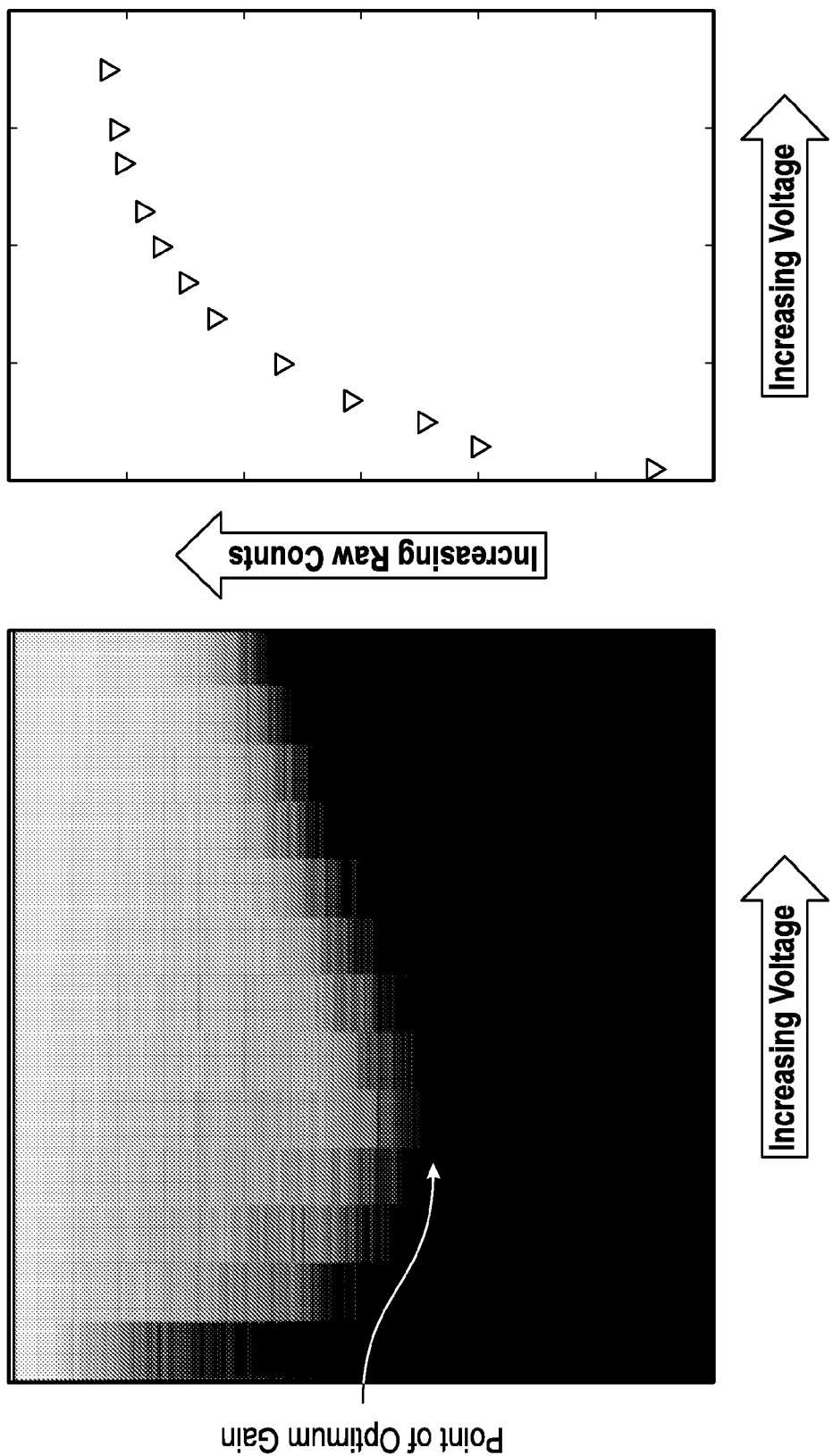
FIG. 11 depicts the optimization of the electric fields used by the GAND detection process whereby trade-off is made between optimum gain and raw counts of events.

FIG. 11 depicts the optimization of the electric fields used by the GAND detection process whereby trade-off is made between optimum gain and raw counts of events.

Figure 12:
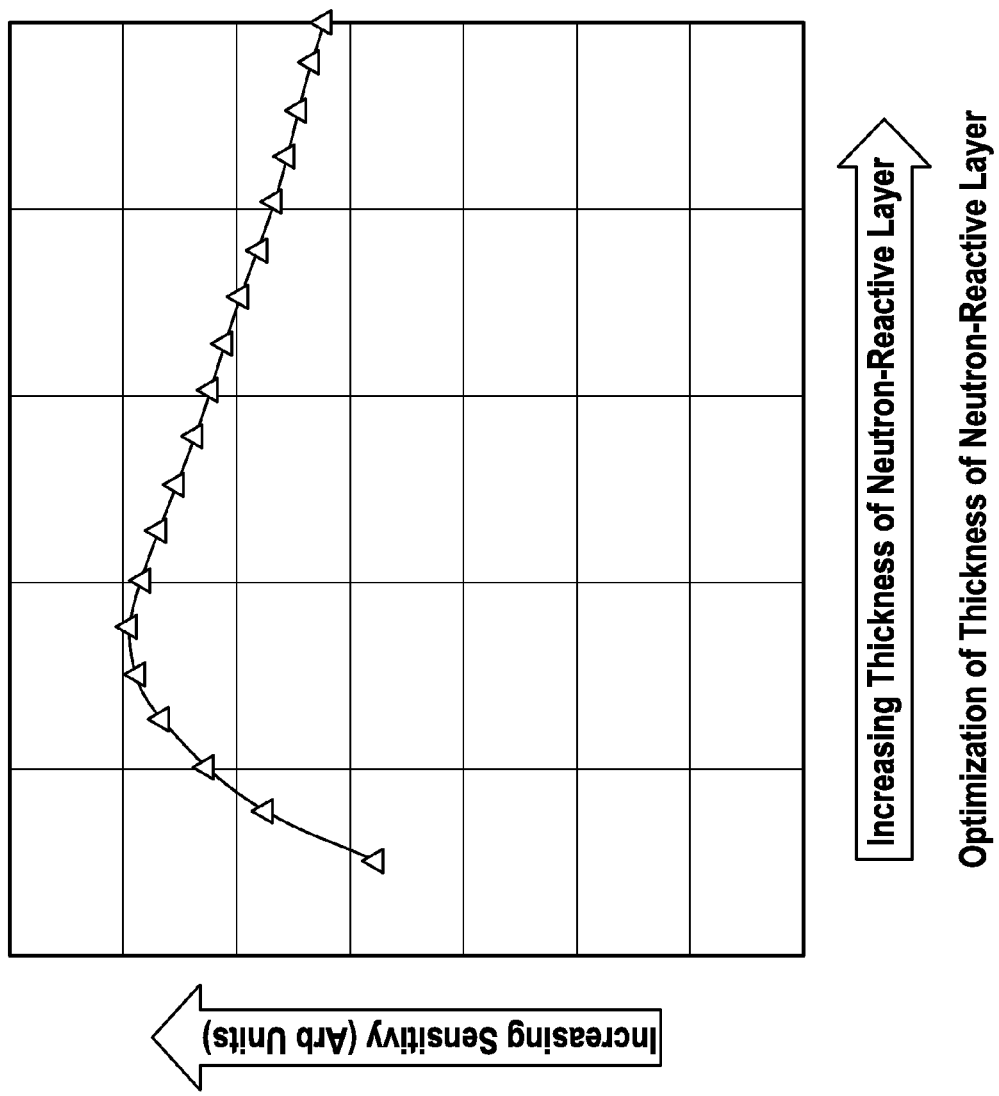
FIG. 12 depicts the optimization of the thickness of the layer of neutron reactive material for best sensitivity.

FIG. 12 depicts the optimization of the thickness of the layer of neutron reactive material for best sensitivity. Optimization provides adequate byproduct of the neutron interaction to permit efficient neutron detection while also not inhibiting the interaction through self-shielding. Furthermore, as additional neutron reactive layers and thermalizing material layers in a GAND assembly are configurable, this optimization becomes a variable for the specific GAND configuration.

Those skilled in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

The invention claimed is:

1. A fast neutron detector comprising:
a moderator adapted to convert at least some incident fast neutrons passing through the moderator from an exterior of the detector into thermal neutrons within an interior of the detector;
a cathode positioned to receive the thermal neutrons and having a face including a material exhibiting thermal neutron capture followed by charged particle emission;
a microstructure amplifier positioned to receive charged particles from the cathode and configured to produce an avalanche of electrons in response to the charged particles; and
an anode positioned to receive the avalanche of electrons from the cathode to provide for detection of the at least some incident fast neutrons;
wherein the anode, the cathode and the microstructure amplifier are immersed in a counting gas so that the microstructure amplifier does not operate in vacuum.

2. The fast neutron detector of claim 1, wherein the anode, cathode, and microstructure amplifier are configured as parallel plates.

3. The fast neutron detector of claim 1, wherein the microstructure amplifier includes at least one surface that includes the material exhibiting neutron captured followed by charged particle emission.

4. The fast neutron detector of claim 3, wherein the material is selected from at least one of boron-10, a boron containing compound, and lithium-6.

5. The fast neutron detector of claim 1, wherein an amplified electron signal representative of the at least some fast neutrons is sensed at the anode and read out via an electronic component.

6. The fast neutron detector of claim 1, wherein the microstructure amplifier is a gas electron multiplier.

7. The fast neutron detector of claim 1, wherein the face of the cathode has a smooth surface.

8. The fast neutron detector of claim 1, wherein the moderator is a high density polyethylene plastic.

9. The fast neutron detector of claim 1, wherein the material exhibiting thermal neutron capture has a thickness in the range of 0.0005 millimeters (mm) to 0.003 mm.

10. The fast neutron detector of claim 1, wherein the microstructure amplifier is adapted for manufacture using industrial circuit card manufacturing techniques.

11. The fast neutron detector of claim 1, wherein the microstructure amplifier includes at least one polyethylene substrate.

12. The fast neutron detector of claim 1, wherein the microstructure amplifier comprises: a perforated insulator having a first surface and a second surface, with the first surface of the perforated insulator covered with a first perforated conductive material and with the second surface of the perforated insulator covered by a second perforated conductive material.

13. The fast neutron detector of claim 12, wherein holes formed in each of the first perforated conductive material, the perforated insulator, and the second perforated conductive material are aligned to establish avalanche regions and traverse paths.

14. The fast neutron detector of claim 13, wherein a plurality of sets of moderators, cathodes, microstructure amplifiers and anodes are arranged in a mirror configuration.

15. A method of detecting fast neutrons using a gas avalanche neutron detector (GAND), comprising:
positioning the fast neutron detector in a location for allowing the neutron detector to interact with a field of fast neutrons;
introducing the fast neutrons to a moderator layer of thermalization material to yield thermal neutrons, the moderator adapted to convert at least some incident fast neutrons passing through the moderator from an exterior of the detector into thermal neutrons within an interior of the detector;
interacting the thermal neutrons with a cathode in the neutron detector, the cathode positioned to receive the thermal neutrons and having a face including a material exhibiting thermal neutron capture followed by charged particle emission;
introducing the charged particles to a counting gas in the fast neutron detector to ionize the counting gas to produce ionization electrons;
interacting the ionization electrons with a microstructure amplifier positioned to receive charged particles from the cathode and configured to produce an avalanche of electrons in response to the charged particles, with the microstructure amplifier immersed within the counting gas so that the microstructure amplifier does not operate in vacuum; and
interacting the avalanche of electrons with an anode positioned to receive the electrons to provide for detection of the at least some incident fast neutrons.

16. The method of claim 15, wherein the microstructure amplifier is a gas electron multiplier and wherein the counting gas is P-10 counting gas.

17. A neutron detector comprising:
- a cathode having a face including a material exhibiting neutron capture followed by charged particle emission; and
- a microstructure amplifier positioned to receive charged particles emitted from the cathode in response to application of neutrons to the cathode and adapted to provide a signal in the form of electrical transients for detection without a separate anode;
- wherein the cathode and the microstructure amplifier are immersed in a counting gas.

18. The neutron detector of claim 17, wherein the material exhibiting thermal neutron capture followed by charged particle emission is configured for use with the fast neutrons.

19. A method of detecting neutrons using a gas avalanche neutron detector (GAND), comprising:
- positioning the neutron detector in a location for allowing the neutron detector to interact with a field of neutrons;
- introducing the neutrons to a layer of thermalization material to yield thermal neutrons;
- interacting the thermal neutrons with a cathode in the neutron detector, the cathode having a face including a material exhibiting neutron capture followed by charged particle emission;
- introducing the charged particles to a counting gas in the neutron detector to ionize the counting gas to produce ionization electrons; and
- interacting the ionization electrons with a microstructure amplifier to create an avalanche of electrons, wherein a signal in the form of electrical transients is detected on the microstructure amplifier without a separate anode.

20. The method of claim 19 wherein the neutrons introduced to the layer of thermalization material are fast neutrons.

* * * * *